United States Patent
Matthews, Jr.

[15] 3,702,539
[45] Nov. 14, 1972

[54] METHOD AND APPARATUS FOR INSTALLING RISERS

[72] Inventor: Jamie F. Matthews, Jr., Houston, Tex.

[73] Assignee: Esso Production Research Company

[22] Filed: May 26, 1971

[21] Appl. No.: 147,090

[52] U.S. Cl. ........................................61/72.3, 285/24
[51] Int. Cl. .................................................F16l 1/00
[58] Field of Search ............61/72.3, 72.1; 166/.5, .6; 285/24, 18

[56] References Cited

UNITED STATES PATENTS

| | | |
|---|---|---|
| 3,503,218 | 3/1970 | Broadway et al. ..........61/72.3 |
| 3,434,296 | 3/1969 | Otteman et al. ............61/72.3 |
| 117,546 | 8/1871 | Kibler ....................285/363 X |
| 3,557,564 | 1/1971 | Hauber ......................61/72.3 |

*Primary Examiner*—Jacob Shapiro
*Attorney*—James A. Reilly, John B. Davidson, Lewis H. Eatherton, James E. Gilchrist, Robert L. Graham and James E. Reed

[57] ABSTRACT

A riser is installed at an offshore platform where pipeline construction terminates by lowering the riser in place adjacent a guide rail mounted on the platform and thereafter clamping the riser to the guide rail by moving clamps or similar connecting members downwardly on the guide rail and riser from the surface.

17 Claims, 12 Drawing Figures

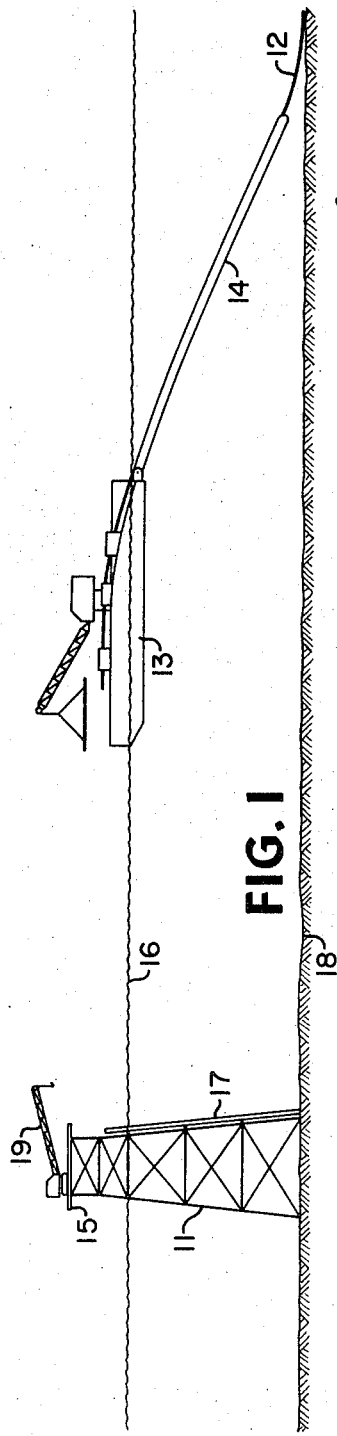
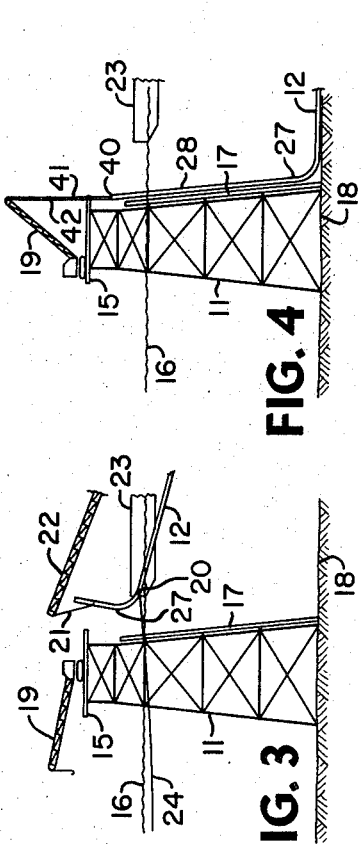
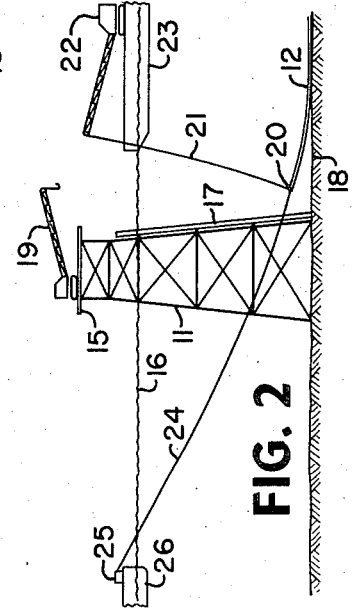
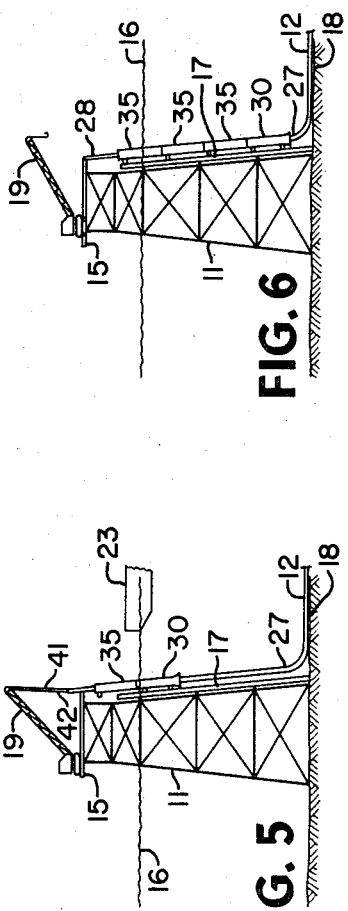
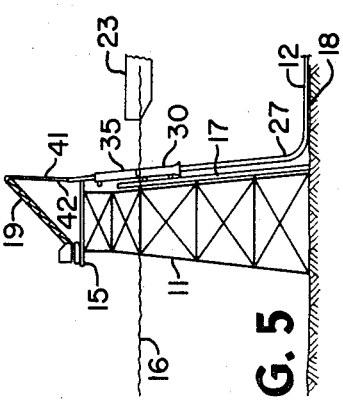
INVENTOR.
JAMIE F. MATTHEWS, JR.

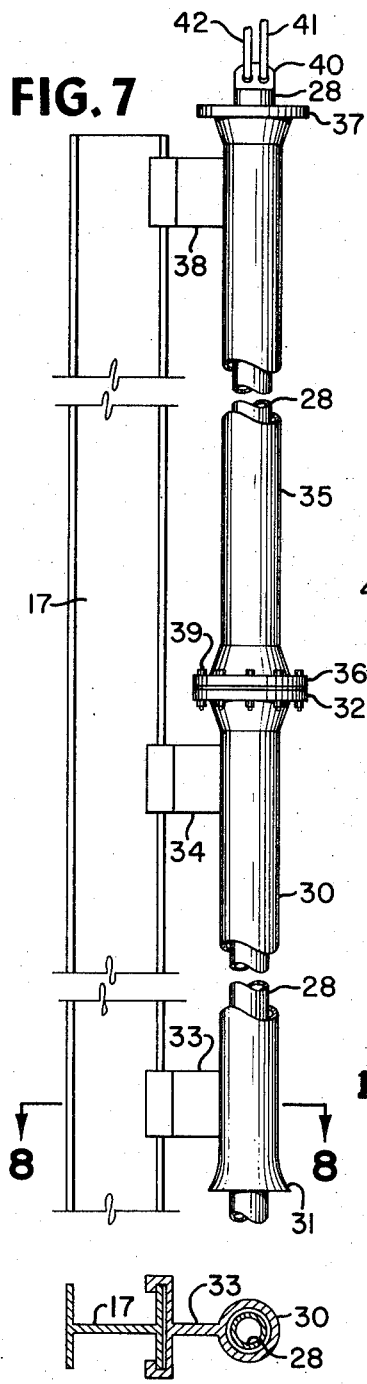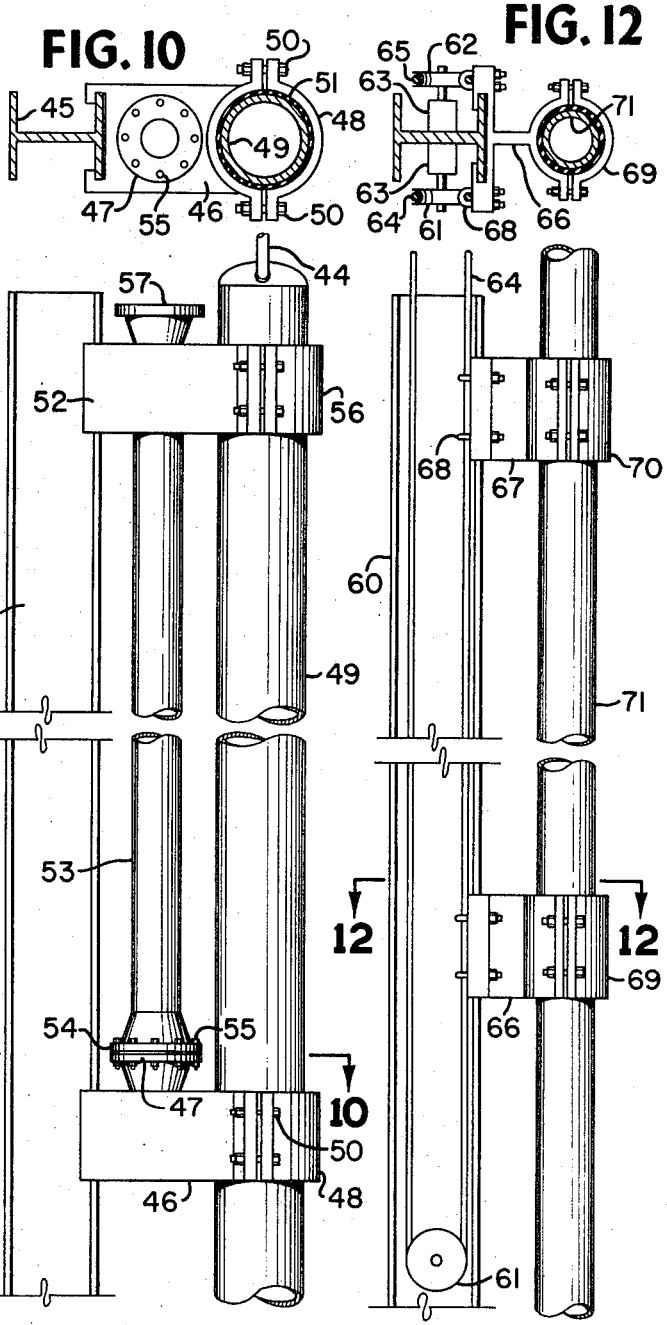

METHOD AND APPARATUS FOR INSTALLING RISERS

BACKGROUND OF THE INVENTION

1. Field of the Invention

This invention relates to the installation of riser pipes at offshore platforms and similar structures and is particularly concerned with a method and apparatus for installing a pipeline riser at an off shore platform where pipeline construction terminates.

2. Description of the Prior Art

Several methods for installing pipeline risers on offshore platforms have been developed in recent years. One such method involves assembly of the riser by first connecting a bend to the end of a pipeline which extends from a lay barge moored near the platform, attaching the bend by means of sliding clamps or similar members to a guide rail which extends down the side of the platform to a point near the ocean floor, and then adding additional riser sections above the bend as the assembly is lowered down the guide rail into place. Since the bend is connected to the end of the pipeline while it is supported above the water and the riser sections are added from the platform or a vessel moored alongside it, the entire operation can be carried out without divers if necessary. This method has pronounced advantages where the pipeline is to be laid after the riser has been installed. It has serious shortcomings if the pipeline is already in place and the riser is to be installed to terminate the line. In the latter case, the free end of the pipeline will normally be too far from the platform after it is raised to the water surface to permit use of the method and other, more expensive techniques must be resorted to. In very deep water, these other techniques may not be feasible.

SUMMARY OF THE INVENTION

This invention provides a new method and apparatus for the installation of pipeline risers on offshore platforms at which pipeline construction terminates that is simple and inexpensive, does not necessarily require the use of divers, and has other advantages over methods employed in the past. The method involves initial placement of the riser adjacent the platform with one end at or near the ocean floor and the other end extending upwardly to the water's surface, the attachment near the water's surface of sliding clamps or similar connecting members to the riser and to a guide member or guide rail extending down the side of the platform structure, and the movement of these connecting members downwardly on the riser and guide member to hold the riser in place. The method can be carried out with sections of pipe that slip downwardly over the riser and are provided with arms that engage and slide along the guide member, with sections of pipe or similar members having cross members for engaging both the riser and the guide member, with cables that pass beneath sheaves near the bottom of the guide member, and are fitted with clamps or similar devices for engaging the riser and guide member, or with similar equipment. Once the clamps or connecting members are in place, the assembly can be welded or otherwise affixed to the guide member above the water level to form a permanent installation.

BRIEF DESCRIPTION OF THE DRAWINGS

FIGS. 1 through 6 in the drawing illustrate various stages in the installation of a pipeline riser at an offshore platform in accordance with the invention;

FIG. 7 is an enlarged, fragmentary view of apparatus that can be used in carrying out the method shown in FIGS. 1 through 6;

FIG. 8 is a cross-sectional view through the apparatus of FIG. 7 taken along the line 8—8;

FIG. 9 is an enlarged, fragmentary view of alternate apparatus for carrying out the method of FIGS. 1 through 6;

FIG. 10 is a cross-sectional view of the apparatus of FIG. 9 taken about the line 10—10;

FIG. 11 is an enlarged, fragmentary view of still other apparatus useful in carrying out the method of FIGS. 1 through 6; and, FIG. 12 is a cross-sectional view through the apparatus of FIG. 11 about the line 12—12.

DESCRIPTION OF THE PREFERRED EMBODIMENTS

FIG. 1 in the drawing depicts an offshore platform 11 to which an underwater pipeline 12 is being laid by means of a lay barge 13 provided with a conventional stinger 14. The platform includes a deck 15 mounted above the surface of the water 16 and a guide rail 17 which is affixed to the side of the platform structure and extends downwardly to a point near the ocean floor 18. A crane 19 is mounted on the deck of the platform. The guide rail will normally be a structural steel wide flange beam or similar member which is mounted on the platform before it is towed into place and erected but other guide rails may be used. The method and apparatus described herein are not restricted to the particular type of platform shown and can also be used for the installation of risers on other offshore structures to which pipelines must be connected.

In the operation shown in FIG. 1, the lay barge has laid the pipeline 12 on the ocean floor 18 along the pipeline route from a point of origin that does not appear in the drawing. The lay barge illustrated is of the conventional type on which pipe sections are welded together, inspected and coated, and then lowered into place on the ocean floor over stinger 14 as the barge moves forward along the pipeline route. In lieu of such a system, other pipelaying methods may be employed. These include the bottom-pull method wherein the line is fabricated onshore, launched into the water, and then pulled into position along the bottom by means of winches mounted on a barge; the floatation method in which long strings of pipe fabricated ashore are towed to the construction site on floats or pontoons, connected by lifting adjacent ends out of the water with the cranes of a tie-in barge, and then lowered into place by systematically removing the floats or pontoons; and the reeled pipe method in which the pipe is unwound from a large reel mounted on a barge and lowered into place on the ocean floor. The particular pipelaying method selected will depend in part upon the distance over which the pipeline is to be laid, the size of the pipe to be handled, the depth of the water along the pipeline route, and other factors. The riser installation method of this invention is not restricted with respect to the method which is used to lay the pipeline and may be used with any of the conventional pipelaying systems.

After the pipeline 12 has been laid up to a point near the platform 11 as shown in FIG. 1, the approximate additional length necessary to terminate the line adjacent to but just short of the base of the platform is calculated. Pipelaying is then continued until the end of the line is reached aboard the lay barge. A padeye or clamp 20 is attached near the end of the line on the lay barge and a cable 21 extending from a crane 22 on crane barge 23, moored near the platform as shown in FIG. 2, is connected to the padeye. The end of cable 24 extending from winch 25 on a pulling barge or tug 26 is also attached to the padeye. The pipeline is then lowered from the lay barge into place on the ocean floor as close to the base of the platform as possible while maintaining sufficient tension on the pipeline to prevent excessive bending of the line. The exact additional pipeline length required to permit attachment of the riser is then determined by means of acoustic equipment run down the guide rail, by means of a submersible, or by means of divers.

Once the pipeline has been laid down adjacent the base of the platform as described above, crane 22 on crane barge 23 is used to raise the end of the pipeline above the surface of the water alongside the crane barge. Tension sufficient to prevent excessive bending is applied from pulling barge 26 by means of cable 24 and winch 25 as the line is lifted. The amount of tension necessary will depend on the weight and dimensions of the pipe, the depth of the water, and other factors and can be readily calculated. In lieu of using a pulling barge or tug to hold the line in tension and thus avoid excessive bending stresses, cables extending from davits aboard one or more vessels moored near the platform can be used to support the line as the end is raised. While the line is being lifted, it may be moved laterally into a position closer to guide rail 17 on the platform if necessary.

After the end of the pipeline has been raised to the surface of the water as indicated in FIG. 3 of the drawing, assembly of the riser is started. The pipeline is secured by a cable or choker alongside the barge 23 and the support and tension applied to the pipeline are assumed by barge 23. At this time cable 24 can be temporarily slacked. A riser bend 27 is picked up by means of crane 22 on the barge and moved into position adjacent the end of the pipeline. The dimensions and configuration of the bend will depend in part upon the geometry of the pipeline and platform but are normally selected so that the upright portion of the riser will extend along guide rail 17 in close proximity to the rail. Any adjustments in the length of the pipeline or the horizontal portion of the bend can be made at this time. Once this has been done, the bend is welded to the end of the line or connected in place by bolts and flanges. Additional riser sections are welded in place above the bend as the pipeline and riser assembly are lowered into the water until the pipeline reaches the desired position at or near the ocean floor and the vertical portion 28 of the riser extends above the water's surface. As the riser is fabricated and lowered, vertical support of the riser is successively transferred between crane 22 and the choker cable alongside the barge, thus freeing the crane to pick up and add on additional lengths of pipe. During the period that the pipeline and riser assembly are suspended above the floor, continuous tension is maintained in the line by means of cable 24 to prevent the generation of excessively high bending stresses. After the riser has been fabricated and positioned adjacent and parallel to the guide rail as shown in FIG. 4 of the drawing, support of the riser is transferred from crane 22 to crane 19. Cables 21 and 24 can then be removed.

The apparatus preferably used to connect the riser to the guide rail is shown in greater detail in FIGS. 7 and 8 of the drawing. As depicted in FIGS. 7 and 8, this apparatus inclues a lower conduit section 30 which is flared at its lower end as indicated by reference numeral 31 and provided with a bolted flange 32 at its upper end. Located near the upper and lower ends are arms 33 and 34. Each arm is welded or bolted to the conduit and provided with means for engaging the outer flange of guide rail 17 so that the assembly can slide along the guide rail 17 as shown in FIG. 8. The arms may be provided with rollers or bearings to facilitate movement of the apparatus on the guide rail flange if desired but this is usually unnecessary.

Positioned above the lower conduit section 30 is an upper conduit section 35. This upper section is similar to the lower section but is provided with flanges 36 and 37 at the lower and upper ends respectively. It also includes a single arm 38 near the upper end. The two sections are held together by means of bolts 39 extending through flanges 32 and 36. As shown in FIG. 7, the vertical portion 28 of the riser extends through the two conduit sections and is supported by means of a padeye 40 to which riser support cables 41 and 42 are attached. As will become apparent later, apparatus other than that shown in FIGS. 7 and 8 can also be employed.

After the riser has been positioned adjacent guide rail 17 as shown in FIG. 4 of the drawing, padeye 40 containing two holes for the attachment of riser support cables is welded or otherwise connected to the top of the vertical portion 28 of the riser. Riser support cables 41 and 42 are suspended from separate lifting means, either by means of two separate drum and sheave systems on crane 19 or by means of two entirely separate cranes, davits, or similar devices. Cable 41 is connected to the padeye to support the riser initially. Riser support cable 42 is then passed downwardly through lower conduit section 30 while the conduit section is suspended above the riser and guide rail and attached to the padeye. Once this has been done, the slack is taken up and support of the riser is shifted to cable 42. Cable 41, which is outside the lower conduit section is then slacked off and disconnected from the padeye on the riser. The lower conduit section is then lowered downwardly along cable 42 onto the riser. The two arms 33 and 34 are fitted over the outer flange of guide rail 17 as the conduit section is moved downwardly. A line from a winch on the platform, not shown in the drawing, may be used to support the lower conduit section during this operation. When the upper end of the lower conduit section reaches a point below the top of the riser, riser support cable 41 is passed downwardly through upper conduit section 35 and connected to the padeye on the riser. Slack is then taken up to support the riser. Support cable 42 is slacked off and disconnected from the padeye. The upper conduit section is moved downwardly until flange 36 abuts against flange 32 on the lower section and the flanged joint is then made up. The two conduit sections are moved further down on the riser, the arm on conduit section 35 being fitted onto the guide rail as it reaches the upper end of the rail. As the conduits are lowered on the riser and guide rail, they guide the riser into alignment with the guide rail and thus correct any misalignment that may have initially existed.

FIG. 5 in the drawing depicts the platform with conduit sections 30 and 35 in place near the upper end of the guide rail. The procedure described is continued until a sufficient number of conduit sections have been installed to extend from the upper end of the riser to a point near the lower end as shown in FIG. 6. Each of the additional upper conduit sections employed will be substantially identical to section 35. The upper end of the uppermost conduit section can then be secured to the guide rail by welding or bolting it in place above the water line. Support of the conduit assembly may also be provided by a pedestal-type stop fabricated on the guide rail near bottom. To eliminate any movement of the upper end of the riser within the conduit, the riser string can also be centralized inside the conduit if desired. It will be apparent that the method thus employed provides a convenient and economical method for the installation of risers on offshore platforms without the necessity for divers and that it has advantages over methods employed heretofore. Although the method is particularly effective for the installation of risers at platforms where underwater pipelines terminate, it can also be used if desired for installing risers at platforms from which pipelines have been laid.

FIGS. 9 and 10 in the drawing illustrate alternate apparatus that may be used in carrying out the method of the invention. The apparatus of FIG. 9 includes a guide rail 45 that extends downwardly along the side of an offshore platform which is not shown in the drawing. The guide rail may be a conventional structural steel beam or similar member. Mounted on the outer flange of the guide rail is a lower guide assembly or connecting member 46 which includes a cross member fitted with a pipe flange 47 on its upper surface, with means for slidably engaging the guide rail, and with a clamp 48 that extends around riser 49 and is held in place by bolts 50. The inner surface of the clamp is preferably lined with rubber, polyurethane, teflon, nylon or a similar resilient, nonconducting material 51 as shown in FIG. 10 to insulate the riser from the clamp and guide rail and protect the riser coating from damage during installation. The clamp is normally designed to provide a slight clearance between the riser and the resilient insulating material when it is bolted up but in some cases it may be preferred to design the clamps for a tight fit and leave the clamp bolts loose. They can be later tightened by divers or manipulators after the riser has been installed and the clamps are in their final position.

The upper guide assembly 52 in the apparatus of FIGS. 9 and 10, similar to assembly 46, is welded to the upper end of pipe or similar supporting member 53 having flange 54 connected to its lower end. Flange 54 on the upper assembly and flange 47 on the lower assembly are connected together by bolts 55. The upper clamp 56 is similar to lower clamp 48 and is designed to fit around and engage riser 49. Flange 57 is provided on the upper end of the guide assembly for connecting another upper section in place.

The apparatus of FIGS. 9 and 10 is used in much the same fashion as that shown in FIGS. 7 and 8. The guide assemblies are attached to the guide rail and riser above the water line while the riser is supported by cable 44 and are moved downwardly on the two until the entire riser has been secured to the guide rail. The uppermost assembly can then be welded to the guide rail to provide a permanent connection. In lieu of using pipes and flanges to connect the clamps together as shown in the drawing, rods, channels or other members which are bolted in place may be employed. One advantage of this system over that shown earlier is that it requires the use of only one riser support cable, instead of two as shown in FIG. 7. This is simplifies handling of the riser and eliminates the need for two separate hoisting systems.

Still other apparatus useful for purposes of the invention is shown in FIGS. 11 and 12 of the drawing. The apparatus depicted includes a guide rail 60 provided with pulleys or sheaves 61 and 62 near its lower end. These are mounted on axles held in place by blocks 63 on each side of the guide rail. Cables 64 and 65 extend downwardly around the sheaves and back to the deck of the platform. Connecting members 66 and 67 are connected to the cables by U-bolts 68 and are designed to ride along the flange of the guide rail as shown in FIG. 12. The connecting members include clamps 69 and 70 which fit around riser 71. Each clamp may be lined with a resilient insulating material to avoid damage to the riser coating if desired. The connecting members are placed over the guide rail flange at a point above the water level, clamped to the cables 64 and 65, and secured around the riser. Each connecting member is moved downwardly on the guide rail and riser a predetermined distance by moving the cables before the next guide assembly is installed. This permits the connection of the riser to the guide rail at spaced points along its entire length without having to use divers.

It will be apparent from the foregoing that the method of the invention can be carried out with various types of apparatus. Regardless of the particular equipment employed, the method has advantages over conventional methods for the connection of risers to offshore platforms and is particularly advantageous in very deep water where the use of divers may not be feasible.

Claims:

1. A method for installing a riser pipe at an offshore structure provided with an elongated guide member extending downwardly into the water alongside said structure which comprises erecting said riser in the water adjacent said guide member, positioning a slidable connecting member on the riser and guide member near the upper end of the guide member, and thereafter moving said connecting member downwardly along both the riser and guide member into position beneath the surface of the water.

2. A method as defined by claim 1 wherein said slidable connecting member is positioned on said riser by lowering said member over the upper end of said riser.

3. A method as defined by claim 1 wherein said slidable connecting member is positioned on said riser by clamping said member around the riser.

4. A method as defined by claim 1 wherein a plurality of slidable connecting members are positioned on and moved downwardly along said riser and guide member in sequence.

5. A method as defined by claim 4 wherein adjacent slidable connecting members are connected to one another to form a rigid assembly.

6. A method as defined by claim 4 wherein said slidable connecting members are moved downwardly along said riser and guide member by connecting them to a cable and moving said cable downwardly.

7. A method for installing a pipeline riser at an offshore platform provided with an elongated guide rail extending downwardly into the water alongside the platform which comprises moving said riser into position parallel and in close proximity to said guide rail, lowering a conduit over the upper end of the riser, slidably attaching said conduit to said guide rail, and thereafter sliding said conduit downwardly along said guide rail and over said riser to secure the riser in place.

8. A method as defined by claim 7 wherein a plurality of conduit sections are lowered over the upper end of said riser, attached to said guide rail, and slid downwardly along the guide rail and riser in sequence, each section being rigidly connected to an adjacent section.

9. A method as defined by claim 8 wherein adjacent conduit sections are connected to one another by bolts and flanges.

10. A method as defined by claim 8 wherein the uppermost conduit section is rigidly connected to said guide rail after the conduit sections are in place.

11. A method for installing a pipeline riser at an offshore platform provided with an elongated guide rail extending downwardly into the water alongside the platform which comprises moving said riser into position parallel and in close proximity to said guide rail, installing a slidable connecting member on the guide rail near the upper end thereof, clamping said connecting member around the riser with sufficient clearance for said member to move along the riser, and thereafter moving said connecting member downwardly along said guide rail and riser into position beneath the surface of the water.

12. A method as defined by claim 11 wherein a plurality of connecting members are installed on said guide rail, clamped around said riser, and moved downwardly along the guide rail and riser in sequence.

13. A method as defined by claim 12 wherein adjacent connecting members are rigidly connected to one another above the water's surface.

14. A method as defined by claim 12 wherein said connecting members are moved downwardly on a cable.

15. Apparatus for connecting a pipeline riser to an offshore platform provided with an elongated guide rail extending downwardly into the water alongside said platform and with a riser pipe extending substantially parallel to said guide rail which comprises an elongated, substantially straight conduit flared at the lower end and of sufficient diameter to move downwardly over said riser, a flange at the upper end of said conduit for connecting a second conduit section in place, an arm extending laterally from said conduit, and means near the outer end of said arm for slidably engaging said guide rail.

16. Apparatus for connecting a pipeline riser to an offshore platform provided with an elongated guide rail extending downwardly into the water alongside said platform and with a riser pipe extending substantially parallel to said guide rail which comprises an elongated, substantially vertical supporting member, a cross member connected to said supporting member and extending laterally therefrom, means on one end of said cross member for slidably engaging said guide rail, means on the other end of said cross member for slidably engaging said riser, and means on at least one end of said supporting member for connecting said apparatus to an adjacent supporting member.

17. Apparatus as defined by claim 16 wherein said supporting member is a section of pipe and said means at the ends of said supporting member comprise pipe flanges.

* * * * *